United States Patent [19]

Zander et al.

[11] Patent Number: 4,902,036
[45] Date of Patent: Feb. 20, 1990

[54] DEFLECTOR RING FOR USE WITH INFLATORS WITH PASSIVE RESTRAINT DEVICES

[75] Inventors: Ronald Zander, Mesa; Dennis J. Wells, Phoenix; Leon Merkley, Mesa, all of Ariz.; Dean Esterberg, Mountain Lakes, N.J.

[73] Assignee: Talley Automotive Products, Inc., Phoenix, Ariz.

[21] Appl. No.: 325,087

[22] Filed: Mar. 15, 1989

Related U.S. Application Data

[63] Continuation of Ser. No. 145,449, Jan. 19, 1988, abandoned.

[51] Int. Cl.⁴ ............... B60R 21/16; B60R 21/26; B60R 21/08
[52] U.S. Cl. ............... 280/736; 280/734; 280/740; 280/743
[58] Field of Search ............... 280/743, 728, 730, 732, 280/734, 736, 740, 741, 742, 743; 422/166

[56] References Cited

U.S. PATENT DOCUMENTS

| | | | |
|---|---|---|---|
| 3,843,152 | 10/1974 | Nonaka | 280/150 |
| 3,907,330 | 9/1975 | Kondo et al. | 280/731 |
| 3,958,949 | 5/1976 | Plantif et al. | 23/281 |
| 4,017,100 | 4/1977 | Gehrig et al. | 280/736 |
| 4,068,862 | 1/1978 | Ishi et al. | 280/740 |
| 4,131,299 | 12/1978 | Ono et al. | 102/531 |
| 4,278,638 | 7/1981 | Nilsson et al. | 280/736 |
| 4,296,084 | 4/1981 | Adams et al. | 422/166 |
| 4,547,342 | 10/1985 | Adams et al. | 422/166 |
| 4,561,675 | 12/1985 | Adams et al. | 280/734 |
| 4,722,551 | 2/1988 | Adams | 280/736 |
| 4,793,631 | 12/1988 | Takada | 280/763 |

FOREIGN PATENT DOCUMENTS 3604843 8/1987 Fed. Rep. of Germany ...... 280/736

OTHER PUBLICATIONS

All Mechanical Airbag System–Breed Automotive Corporation.
Inflatable Restraint Systems Capabilities–TRW Corporation.
Inflatable Restraint Systems–TRW Corporation.
Talley Series 90 Inflator Brochure–Feb., 1987.
Aluminum/Radial Passenger Module Lightweight Inertia Welded Inflator–Morton Thiokol, Inc.
Inland Division of General Motors Passenger Airbag System Programs–Morton Thiokol, Inc.

Primary Examiner—Richard A. Bertsch
Attorney, Agent, or Firm—Pennie & Edmonds

[57] ABSTRACT

A vehicle passive restraint device comprising an air bag positioned between an occupant of the vehicle and an interior portion thereof for protecting the occupant from an impact with the interior portion in the event of a collision involving the vehicle; a generator for producing a sufficient quantity of a gaseous combustion product to inflate the air bag means in an interval occurring between the collision and the impact in order to prevent the impact; and a deflector ring positioned between the air bag and the generator for attaching the bag to the generator and extending a sufficient distance into an interior portion of the air bag for preventing hot combustion gases and particulates produced within the generator from impinging directly against an inner surface of the bag. The deflector ring is stamped from a relatively light weight material utilizing conventional stamping equipment without the necessity of subjecting the ring to any machining treatment. The ring possesses sufficient structural strength to position and maintain the air bag in relation to the generator when the generator is actuated in order to inflate the air bag.

23 Claims, 3 Drawing Sheets

DEFLECTOR RING FOR USE WITH INFLATORS WITH PASSIVE RESTRAINT DEVICES

This is a continuation of application Ser. No. 145,449, filed Jan. 19, 1988 now abandoned.

FIELD OF THE INVENTION

The invention relates to an inflator apparatus capable of producing a sufficient quantity of a gaseous combustion product to inflate a passive restraint device such as an automobile air bag. More particularly, it concerns the use of a ring-shaped member to prevent the impingement of hot gases and/or particulate materials directly upon the inner surface of the air bag.

BACKGROUND OF THE INVENTION

During the deployment of a passive restraint device in the event of a collision involving a vehicle in which the device is installed, gases and particulate combustion products, produced at temperatures in excess of 1,000° F. during the initial portion of the propellant burning cycle, impinge directly upon the fabric of the bag. If no protective measures are taken, such as: (1) by incorporating additional, i.e., "sacrificial", layers of fabric into the bag at the point where it is contacted by the hot gases and the energetic particulates, or (2) by installing a deflection member between the generator and the air bag, this impingement may result in the bag becoming burned through, with a resultant failure of the restraining device to perform as desired.

Manufacturers of currently marketed air bag systems have generally elected to do both, i.e., by providing a sacrificial layer and a gas deflection member. The deflection members in current use, however, are expensive, machined parts which are fabricated from heavy steel plate and which can not be stamped with conventional stamping equipment. This adds both to the cost of the inflator and the weight of the completed assembly. As is well known in the automotive art, any increase in vehicle weight is to be avoided if possible due to its negative impact upon gas mileage. The main function of these machined members appears more directed to simply attaching an air bag to a gas generator rather than to deflecting hot gases and particulates away from the fabric of the bag since they do not extend any appreciable distance into the mouth of the bag.

Further, with regard to the means for inflating air bag systems such as those described herein, many forms of gas generators or inflators utilizing combustible solid fuel gas generating compositions are known. Commonly encountered features among generators utilized for this purpose are the inclusion within a housing of a gas generant composition and means to filter and to cool the gas, positioned between the composition and the gas discharge orifices, as defined by the generator housing.

One such gas generator includes an annular reaction or combustion chamber which is bounded by an outer casing or housing structure. The combustion chamber encloses a rupturable container or cartridge that is hermetically sealed and which contains therein a solid gas generant in pelletized form, surrounded by an annular filter. This generator further includes a central ignition or initiator tube and a toroidal filter chamber adjoining and encircling the combustion chamber. An inner casing or housing structure is located in close surrounding and supporting relationship to the rupturable container, the inner casing being formed by a cylinder having uniformly spaced peripheral ports or orifices near one end. These orifices provide exit holes for the flow of gas from the combustion chamber.

Alternately, a generator housing may be provided, comprising first and second structural components or shells, specifically, a first or diffuser shell and a second or base shell. Both shells are forged and heat treated, after which they undergo machining to obtain a proper fit. The first structural component, i.e., the diffuser shell, is formed with three integral concentric cylinders which form the inner structural walls of the inflator and which define chambers therein containing the solid gas generant, ignition materials, and filters, as well as providing exit openings or ports for the passage of the gasses from chamber to chamber and subsequently into the protective air bag.

The second structural component of this embodiment, known as the base shell, may utilize an electrical initiator (squib) for igniting the main propellant charge as well as a flange for attaching an air bag thereto. It also provides three concentric mating surfaces for the concentric cylinders of the diffuser shell. The three concentric cylinders of the diffuser shell are thus joined to the corresponding concentric mating surfaces located upon the base shell.

Still further, other inflator devices which are known in the art comprise a base plate and a diffuser plate having a peripheral portion thereof sealingly connected to a corresponding portion of the base plate. This connection is made by, for example, a light weld between these two parts. The subject inflator additionally comprises means for engaging the base plate and the diffuser plate in operative association. These means pass substantially perpendicularly through both said plates and are preferably rivets, although bolts or screws may also be utilized for this purposes. Such engaging means are capable of permitting a minimal degree of separation between the diffuser plate and the base plate of the inflator in the event that the generator unit becomes overpressurized. This arrangement permits the rapidly generated gaseous product to be safely directed away from the generator, thus preventing a catastrophic fragmentation of the generator housing.

Gas generators, or inflators, of the type described above, must withstand enormous thermal and mechanical stresses for a short period during the gas generation process. Thus, inflators that have been and are currently being used with automobile or other vehicle air bags have previously been fabricated using steel for the casing and other structural housing components, with these components being joined together by screw threads, roll crimping or welding.

The recent emphasis on weight reduction for the purpose of fuel conservation in motorized vehicles, however, has created a need and a demand for a lighter weight inflation system. This is of particular importance in a crash protection system for the driver wherein the inflator is mounted on the vehicle's steering wheel. The availability of a lighter weight inflator for installation at this location further enables a reduction to be made in the weight of the vehicle's steering wheel and the steering column on which the inflator is mounted.

In this regard, some recently introduced inflator devices utilize aluminum casing materials. While this does alleviate somewhat the problem of excessive generator weight, aluminum generators tend to be more expensive in terms of production costs than the stamped stainless steel models currently in general use. More importantly, however, aluminum also tends to lose considerable strength at elevated temperatures, which becomes of concern should the airbag system be exposed to a car fire. Since the gas generator is a pressure vessel, as noted above, concern exists over the possible fragmentation of a weakened aluminum generator casing upon a sudden overpressurization of the device due to an ignition caused by such a fire.

Various means, as described above, have been utilized with the prior art inflators described herein to prevent the impingement of hot gasses and/or particulate materials directly upon the inner surface of an air bag installed in operative association therewith. Thus, as described below, the present invention describes and claims a novel deflector member configured and adapted to permit a safe, rapid inflation of an air bag component in a motor vehicle passive restraint device to assist in ensuring the safety of the vehicle occupants in the event of an accident.

SUMMARY OF THE INVENTION

In accordance with the teachings of the present invention a vehicle passive restraint device is provided, comprising an air bag positioned between an occupant of the vehicle and an interior portion thereof. This air bag protects the occupant from an impact with the interior portion of the vehicle in the event of a collision. The device further comprises a gas generator for producing a sufficient quantity of a gaseous combustion product to inflate the air bag within the interval between a collision involving the vehicle in which it is installed and an impact of the occupant with the interior portion of the vehicle, in order to prevent this impact.

Additionally, the device comprises a deflector ring positioned between the air bag and the generator for attaching the air bag to the generator. The deflector ring extends a sufficient distance into the interior of the air bag to prevent hot combustion gases and particulate materials produced as a result of the combustion reaction occurring within the generator from impinging directly against an inner surface of the bag.

The deflector ring is stamped from a relatively lightweight material utilizing conventional stamping equipment without the necessity of machining this member in any manner whatsoever. In addition, the ring member possesses sufficient structural strength to position and maintain the air bag in relation to the generator when the generator is actuated in order to inflate the air bag.

In one embodiment of the invention, the deflector ring is stamped from a relatively lightweight material utilizing conventional stamping equipment.

The material currently utilized for this purpose is low-carbon steel, which is of sufficient durability to resist damage by the hot gases and particulates exhausted from the generation during its firing phase. A number of alternate compositions, such as aluminum, titanium and even stainless steel, i.e., metals having a high degree of strength and low weight may, however, be chosen for use in stamping the deflector ring. The even lower weight of these materials would thus be useful in decreasing the weight of the entire passive restraint assembly.

As a result of the stamping process described above, the deflector ring is produced as a circular member having a "Jshaped" cross-sectional configuration. Additionally, the ring further comprises a plurality of mounting holes defined by a base portion thereof, these holes being evenly spaced along the circumference of the ring. The deflector ring is mounted upon a mounting plate by fastening means which are inserted through apertures defined by the plate and thereafter through the mounting holes in the deflector ring. These fastening means may be, for example, screws, bolts or rivets. Alternate fastening means such as adhesives may also be used. The Jshaped deflector ring is mounted such that a shorter leg portion of the ring is positioned adjacent to the generator whereupon the remaining longer leg portion thereof is positioned at a location relatively removed from the generator.

In an alternate embodiment of the invention, the vehicle passive restraint device comprises the air bag, generator and deflector ring as described above wherein the generator is comprised of a base plate and a diffuser plate having a peripheral portion sealingly connected to a corresponding portion of the base plate so as to form a portion of a generator housing. The base plate and diffuser plate are connected by engaging means passing perpendicularly through both plates. These connector means are capable of permitting a minimal separation between both the diffuser plate and the base plate in the event of an overpressurization of the generator to safely direct gas away from the generator housing.

The generator housing defines at least three concentrically aligned toroidal zones. A first such zone contains means for igniting a gas generating composition. A second zone contains a solid gas generating composition operable upon ignition to produce gas and particulate reaction products. A third zone contains filtration means to cool the gas and to trap the particulate products. The third zone is further provided with a plurality of orifices for discharging gas from the generator housing.

In the embodiment described above, the deflector ring is stamped from a relatively lightweight material, i.e., a sheet of low carbon steel, with conventional stamping equipment. Various other metals, such aluminum, titanium and stainless steel, may be useful, as noted above, as replacements for the low carbon steel due to their decreased weight in comparison to the steel. The deflector ring of this embodiment is stamped as a circular member having a J-shaped cross-sectional configuration. The ring further comprises a plurality of mounting holes through a base portion thereof which are evenly spaced along the circumference of the ring.

In a further embodiment of the invention, the deflector ring is mounted upon a mounting plate by fasteners inserted through apertures defined by the plate which pass through a layer of the air bag material sandwiched between the mounting plate and the deflector ring and thereafter through the mounting holes in the deflector ring. These fasteners may be, for example, screws, bolts or rivets. Additionally, an adhesive may also be used to fasten the deflector ring to the mounting plate. The deflector ring is mounted such that a shorter leg portion of the ring is positioned adjacent to the generator whereupon the remaining, longer leg portion thereof is positioned at a location relatively removed from the generator.

In another embodiment of the invention, the means for engaging the base plate with the diffuser plate of the generator housing is a plurality of rivet members arranged around the outer peripheral portion of the generator housing. Further, both the diffuser plate and the base plate additionally comprise corresponding flanges located along the outer peripheral portion thereof.

Each flange defines at least one aperture therethrough for attaching the generator to a mounting plate as well as to the deflector ring. In the embodiment described above, the diffuser plate and the base plate of the generator housing are at least partially connected along their peripheral edges by a light weld.

In a still further embodiment of the invention, the first zone of the generator contains an enhancer packet comprising a homogeneous mixture of an ignition enhancing material and an auto ignition composition. Additionally, the second zone of the generator further comprises pre-filtering means located along an outer peripheral portion thereof comprising at least one layer of a screening material positioned so as to remove a portion of the particulate products from the gas.

In another embodiment of the invention, the third zone of the generator includes a first portion containing first filtering means for removal of a major portion of the particulate reaction products from the gas and a second portion containing second and third filtering means for removing substantially all of any remaining particulate reaction products from the gas. Prior to the complete pressurization of the generator, gas passes through the first filtering means prior to passing through the second filtering means. Once the first filtering means is substantially pressurized, however, which occurs almost instantly, the gas no longer flows into the first filtering means, but rather it flows directly into the second filtering means. The inertia of the relatively heavier metal particulates, however, carries them directly into the first filtering means and subsequently through the third filtering means.

The first filtering means comprises a chamber substantially filled with a plurality of unaligned metal fibers (such as steel wool fibers). The second filtering means comprises a screen having a predetermined mesh size. This mesh size is sufficient to prevent the passage therethrough of substantially all of the particulate reaction products from the gas. The third filtering means comprises a screen having a mesh size relatively narrower than that utilized with the second filtering means. The gas exits the generator housing through a plurality of diffusion ports located along the peripheral portion of the diffuser plate, adjacent and exterior to the third filtering means.

A still further embodiment of applicants' vehicle passive restraint device comprises an air bag, a gas generator and a deflector ring. The generator utilized in this embodiment comprises a housing constructed of a relatively lightweight, corrosion resistant, high tensile strength material. The housing defines at least three concentric toroidal zones. A first zone contains means for igniting a gas generating composition. A second zone contains a solid gas generating composition operable upon ignition to produce gas and particulate reaction products. A third zone contains filtration means to cool the gas and to trap the reaction products. The third zone is further provided with a plurality of gas discharge orifices.

The gas generator of this embodiment additionally comprises a base plate and a diffuser plate having a peripheral portion thereof sealingly connected to a corresponding portion of the base plate so as to form a portion of a generator housing. The base plate and the diffuser plate are connected by engaging means passing perpendicularly through both the diffuser plate and the base plate. These engaging means are capable of permitting a minimal separation between both plates in the event of an overpressurization of the generator in order to safely direct gas away from the housing.

Also included in this embodiment of the generator are means for igniting the solid gas generating composition located within an aperture in a central portion of the base plate. An enhancer packet comprising a homogeneous mixture of an ignition enhancing material and an auto ignition composition is located in the first zone of the generator housing. Further, spacer means are positioned between the solid gas generating composition and the generator housing to prevent abrasion of the gas generating composition caused due to contact with an inner surface of the housing.

Additionally included within the embodiment described above are prefiltering means located along a peripheral portion of the first zone of the generator between the solid gas generating composition and the third zone of the generator. Further, filtering means are located in the third zone of the generator and comprise a first portion for removal of a major portion of the particulate reaction products from the gas and a second portion for removing substantially all of any remaining particulate reaction products. Subsequent to the pressurization of the generator, the gas passes through the second portion of the filtering means prior to passing through the third portion. As noted above, the heavier particulates fly directly into the first portion of the filter where they are subsequently trapped. The generator housing further comprises a plurality of gas diffusion ports located along the peripheral portion of the diffuser plate.

In the embodiment described above, the solid gas generating composition is provided in the form of a plurality of pressed toroidal disks in stacked relation, each disk having means to permit air to circulate around at least a portion of one of its surfaces. The gas produced by the combustion of the toroidal disks is cooled and cleaned by passing through the prefiltering and filtering means.

DETAILED DESCRIPTION OF THE PREFERRED EMBODIMENT

Gas generators of the type described herein are useful for the rapid generation of large volumes of gas, the amount and type of gas to be generated being determined, at least in part, by the type of combustible generant composition chosen for use in the generator, the amount thereof and the burning surface provided thereby. The gas produced may be toxic or non-toxic, noxious or non-noxious, depending upon the desired application and the starting materials chosen.

At the present time, the most widespread commercial application for such generators has involved their use in producing a sufficient volume of gas within a suitably short interval, i.e., within about 35–60 milliseconds, for inflating an air cushion device, i.e., an air bag, in an automobile passive restraint system. The following description of the invention, given with reference to the attached drawing figures, will therefore be directed to such a use.

One must keep in mind, however, that while the generator described below represents an inflator for use with a preferred embodiment of the invention, the deflector ring member disclosed herein may be utilized in conjunction with a variety of inflators of varying construction. The present invention should thus not be limited simply to the embodiments described herein but rather it should be considered to encompass such modifications and embodiments as may be envisioned by those of ordinary skill in the related art.

Figure 1:
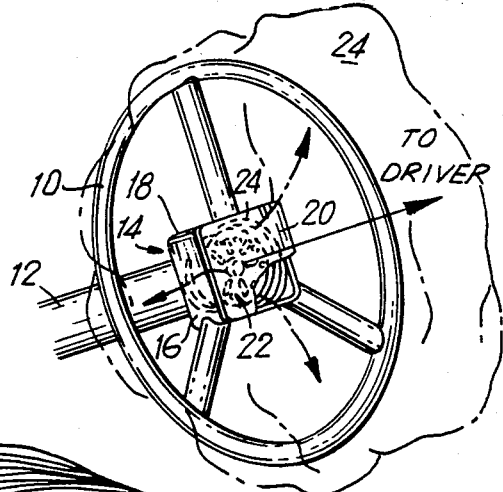
FIG. 1 is a perspective view demonstrating a preferred location for applicants' passive restraint system as described herein.

Referring initially to FIG. 1, there is illustrated, in perspective, a vehicle occupant restraint system designed for installation within, for example, the steering column of a motor vehicle such as an automobile for protecting the driver thereof. It should be noted, however, that the "air bag" application herein described may also include, in the event of a collision between the automobile and a second stationary or moving object, the use of one or more of such generators to inflate at least one passive restraint located within the zone normally occupied by a driver and passengers traveling within the vehicle.

This view depicts a substantially circular steering wheel 10 positioned upon steering post 12 and connected to a mechanism (not shown) for turning the front wheels of the vehicle from side to side. Located within a central portion of wheel 10 is housing 14 formed of opposing side members 16, 18 and cover member 20. Generator 22 which is operatively associated with air bag 24, is secured in position within housing 14 by mounting plate 36. Plate 36 may be connected to generator 22 with the use of apertures 35 defined by flanges 30, 32, through which may be passed connecting elements such as rivets, bolts or screws (not shown). Air bag 24 is folded for storage and packed atop generator 22 in preparation for its use. Cover member 20 is subsequently installed to hide the entire assembly from sight and to improve the aesthetic appearance of the vehicle's interior.

Generator 22 of the invention is preferably constructed of a material, such as 301 annealed stainless steel, which is lighter, stronger and more corrosion resistant than the material often used in the prior art to construct such devices, e.g., 4130 steel. In fact, a generator unit constructed of the annealed stainless steel described above may be up to 40% lighter than a generator constructed to the same dimensions with 4130 steel. This weight reduction has been accomplished without sacrificing high temperature tensile strength which does occur, for example, if a lightweight material such as aluminum or titanium is used to construct the generator. The invention should not be limited to the particular material, i.e., 301 annealed stainless steel, described above, however, since there are a number of materials, well known to those in the art, which combine the features of reduced weight and high strength, even at elevated temperatures (such as those which may occur during a car fire).

Figure 2:
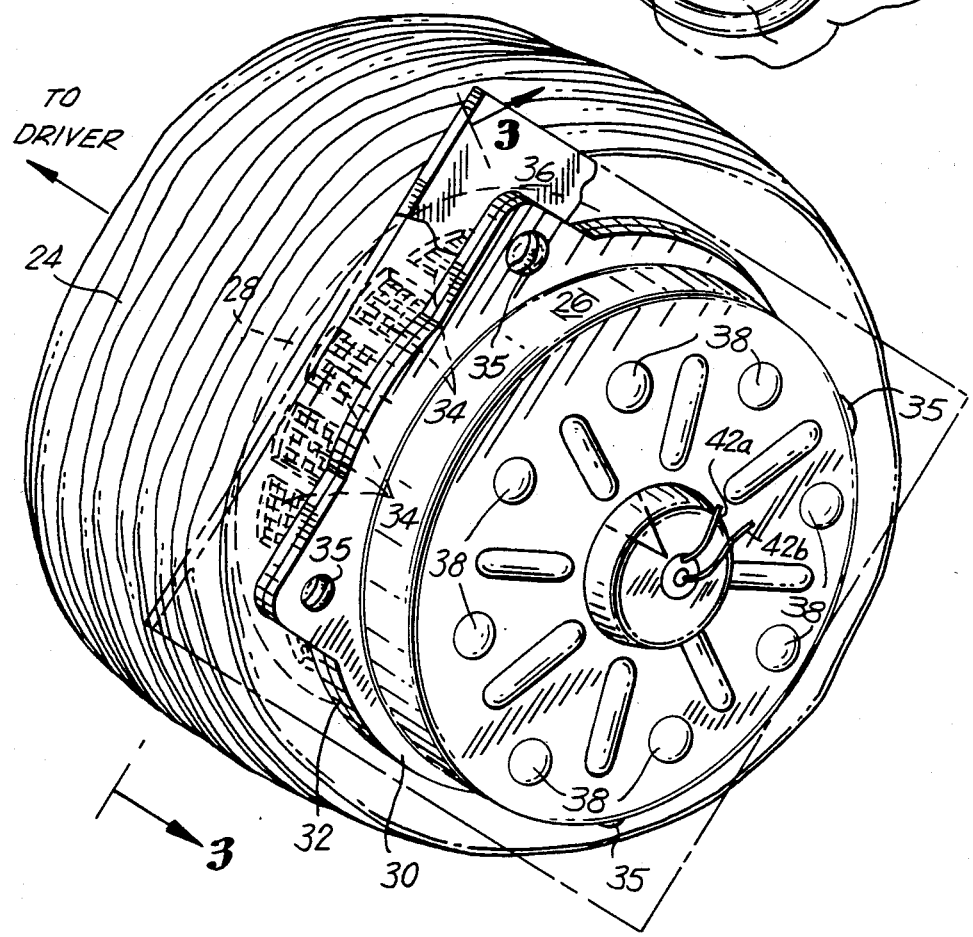
FIG. 2 is a bottom perspective view of applicants' passive restraint system.

Turning now to FIG. 2, this view depicts both the lower, i.e., base plate 26 and the upper, i.e., diffuser plate 28 which comprise generator 22 of the present invention. These two plates 26, 28 are preferably joined at mounting flanges 30, 32 which may be attached with the use of connecting elements such as rivets, screws, bolts, etc. to mounting plate 36 (shown in phantom). Flanges 30, 32 are preferably sealed with a small, resistive 360° plasma or laser weld for sealing the peripheral portions of plates 26, 28 together.

This weld serves to seal the flange mating area to prevent gas leakage therethrough during normal operation of generator 22 so that the gases formed as combustion products exit the generator through a plurality of diffusion ports 34 defined by diffuser plate 28. In the event generator 22 becomes overpressurized for any reason, this weld is blown open by the expanding gas. This arrangement serves to release the gas away from the occupant in a safe, ductile manner without rupturing the housing of the inflator.

The use of a weld as described above contrasts with the usual prior art method of sealing the generator housing in which the peripheral edges of the generator are normally crimped together. The weld used with the present generator thus acts as a safety valve to prevent the explosive projection of metal shards from the generator's housing through the interior portion of the vehicle with consequent injury and/or death to any occupants thereof.

A common cause of such overpressurization in generators constructed for use in a motor vehicle passive restraint system is a car fire. The high temperatures encountered as a result thereof often act to reduce the strength of the metal generator casing prior to setting off the main propellant charge therein. Generators utilized for other applications may, of course, become overpressurized due to the influence of other factors known to those in the art.

A second feature in the design of applicants' gas generator is the use of rivets 38 for joining base plate 26 and diffuser plate 28. Rivets 38 replace costly threads or unreliable structural welds commonly relied upon in previous inflator designs. The gas generator unit of the invention is thus designed to open in a manner similar to that of a clam shell in order to release excess pressure rather than exploding if the propellant stored within the generator becomes deteriorated under unusual conditions, such as when the device is exposed to a fire.

Under the abnormal conditions described above, the weld connecting the peripheral portions of flanges 30 and 32 is fractured due to the impact of the rapidly generated gases which thus gradually releases the pressure within the generator. This permits the two halves of the unit, i.e., base plate 26 and diffuser plate 28 to move apart in a manner similar to the opening of a clam's shell, yet remaining secured proximate to each other by rivets 38. Rivets 38 thus extend perpendicularly to plates 26, 28 from a point on the outer surface of base plate 26, passing through the inner portion of the generator to the outer surface of diffuser 28.

Figure 3:
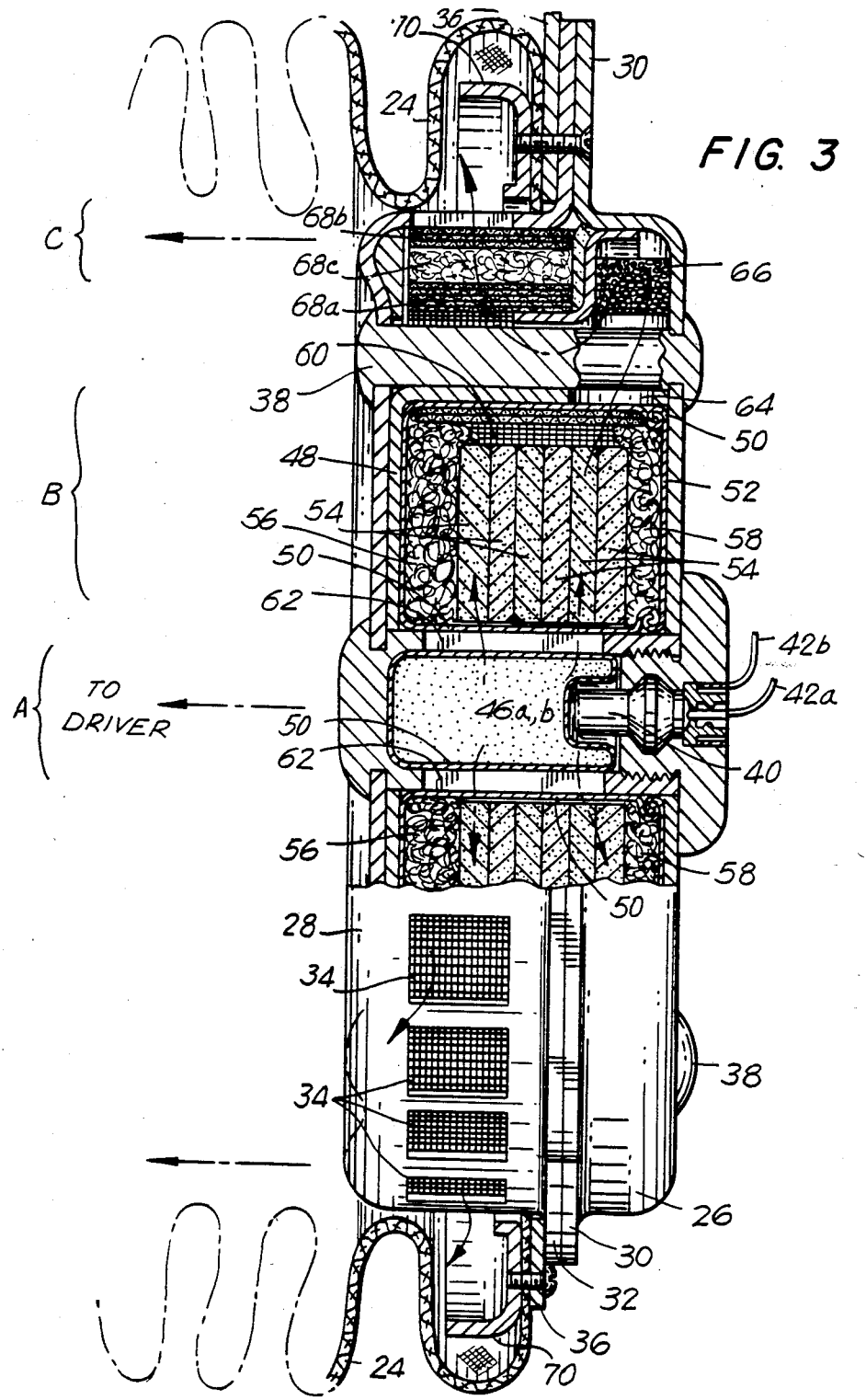
FIG. 3 is a sectional view of applicants' restraint system taken through line 3—3 of FIG. 2.

FIG. 3 displays several of the same features of generator 22 which have previously been described with regard to FIG. 2. These features have therefore been designated with the same numbers in both Figs.

FIG. 3 is a sectional view of applicants' generator 22 further illustrating the clamshell sealing arrangement between base plate 26 and diffuser plate 28 with the use of rivets 38, and depicting the sinuous path taken by the gas flow within the generator to filter and cool the combustion product. This tortuous gas path, which is another novel feature of the applicants' invention, will be further described in detail below. While the basic method of operation for generators 22 of the type disclosed herein is well known and need not be further disclosed, applicants' generator has several novel features which will be described below in further detail.

Applicants' inflator device 22 defines three concentrically arranged toroidally shaped chambers which may be designated as ignition chamber (A) combustion chamber (B) and filtration chamber (C) as one moves from the center to the periphery of the gas generator. Ignition chamber (A), the innermost annular portion of the generator, comprises an ignition means, such as, preferably, an electrically activated initiating squib 40 as depicted in FIG. 3. Squib 40, containing a small charge of electrically ignitable combustible material, may be connected to at least one remote sensing device (not shown), of a type well known in the art located within, for example, the front bumper or side fender of an automobile, by electrical leads 42 a, b.

The ignition chamber also contains enhancer packet 44 having a quantity of an enhancer material, such as a commonly employed boron potassium nitrate ($BKNO_3$) mixture which is preferably employed in a powdered form 46(a) in order to provide the maximum available burning surface for the fastest possible response. Other rapidly combustible materials known to those in the art may be utilized for the same purpose but applicants have obtained a consistently high degree of performance with the use of $BKNO_3$.

While $BKNO_3$ is very successful in igniting the main propellant charge located in combustor chamber (B), it suffers from a serious deficiency in that the autoignition temperature of this material is extremely high, i.e., from about 600°–700° F. Since the compositions chosen for the main propellant charge of generator 22 ignite at an even higher temperature in the conditions normally encountered in, for example, a car fire, the ignition material within the unit would be at a temperature in excess of 600° F. before ignition would take place.

In such a situation, the generator housing would be subjected to even higher temperatures, i.e., in the range of from 800°–900° F., and the main propellant charge would also be at a high temperature, perhaps 400°–500° F. Under these conditions, under laws of temperature and pressure well known to those skilled in the propellant art, the propellant charge would burn very rapidly and generate gas at an extremely high pressure, thus creating a situation wherein an explosive fragmentation of the weakened generator housing was a distinct possibility.

Applicants have therefore incorporated an autoignition material 46(b) with the $BKNO_3$ in enhancer packet 44. This material is capable of autoignition at a lower temperature than $BKNO_3$. Its use would result in an ignition of the main propellant charge while this charge was at a much lower temperature than that described above. Thus, the propellant charge may be burned at a much lower rate and produces a significantly lower pressure. This additional "auto ignition" material is preferably a stabilized nitrocellulose composition such as IMR 4895 which autoignites at less than about 400° F. This preferred material is produced by the DuPont Corporation, but any material capable of performing in this manner would be acceptable for use in the present invention.

The end effect of combining such an auto-ignition material with, for example, the $BKNO_3$ enhancer composition so as to render this mixture an integral part of applicants' ignition chain is to prevent a weakening of the generator housing, thus diminishing or altogether removing the chance of an explosive overpressurization. This removes one potential danger to passengers and/or bystanders in the event of a car fire.

Combustion chamber (B) of the present gas generator 22 is formed from an outer, toroidally shaped, three-sided combustor cup 48, open along one longitudinal plane, which concentrically surrounds inner combustion container 50, configured to fit within cup 48. It is hermetically sealed by member 52 to prevent the entrance of moisture. Member 52 may be, for example, crimped along both its inner (i.e., in the vicinity of the igniter chamber) and outer peripheral edges so as to maintain container 50 in a closed condition prior to the operation of the generator unit.

Cup 48 is preferably formed of a metal, such as aluminum, to take advantage of its strength and heat conducting properties. Optionally, however, cup 48 may be constructed of a thermoplastic material which is both cheaper and easier to manufacture, i.e., by a molding technique. One consideration with the use of such a plastic, however, is the possible formation of toxic hydrocarbon reaction products, which should be avoided in order to prevent the exposure of the vehicle's occupants to the effects of a toxic gas when the generator of the invention is used for air bag applications.

Into inner container 50 is placed the main propellant charge 54, which may be supplied in a variety of physical forms. It may, for example, be poured as a powder or it may be inserted in the form of a number of substantially circular pellets, ranging in size from that of an aspirin tablet to an Alka-Seltzer ®. Applicants have determined, however, that superior results are obtainable by forming the propellant charge into a series of pressed, flat, toroidal discs which may be maintained in a spaced arrangement so as to provide the maximum possible burning surface. This spaced arrangement is obtainable with the use of one or more raised ridges (not shown) or spacers extending upwardly from a portion of each disc, perpendicular to its longitudinal diameter which facilitates the passage of a flame front in the space thus created therebetween.

A variety of compositions, well known to those of ordinary skill in the art, may be utilized as the main propellant charge for the gas generator described herein. Applicants prefer, for use in their present generator, the various compositions described in U.S. Pat. No. 3,895,098 to John F. Pietz, issued July 15, 1975, now reissued as Re 32,584 and entitled METHOD AND COMPOSITION FOR GENERATING NITROGEN GAS, which is assigned of record to the assignee of the present invention. The disclosure thereof is therefore incorporated herein by reference. Chief among these propellant compositions are those propellants comprising a mixture of sodium azide with copper oxide.

Alternatively, compositions substituting nickel and iron oxidizers may be utilized, but these generants, although capable of a slightly higher effective gas output than the $CuO/NaN_3$ mixture described above, often require the addition of an ammonium perchlorate burn rate enhancer to reach their full potential (as disclosed in U.S. Pat. No. 4,604,151 issued on May 8, 1986 to Knowlton and Pietz, also incorporated herein by reference, entitled METHOD AND COMPOSITION FOR GENERATING NITROGEN GAS INCLUDING AMMONIUM PERCHLORATE CATALYST. This patent is also assigned of record to the present Assignee). Since, as discussed above, a large number of different generant compositions are operable within the present generator 22, the present invention should not be limited to the compositions disclosed above.

In an alternate embodiment of the invention, the propellant may be molded or extruded into a single porous grain which conforms to the volume and the shape of the combuster cup. Such a grain may be utilized with either a metal, e.g., aluminum, or plastic cup as disclosed above. An important feature to consider with the use of such a porous propellant grain is to ensure that the grain is formed having a sufficient degree of porosity to provide a sufficient burning surface to permit the flame front to advance through the grain with sufficient speed so as to provide a sufficient volume of gas within, for example, the 35–60 millisecond period described above.

The main propellant charge is insulated against abrasion caused by contacting the top and/or bottom portions of inner combustion container 50 by the use of inert spacer pads 56, 58. Pads 56, 58 may be formed, for example, from a ceramic fiber pad of a mixture of alumina oxide and silica oxide and sold under the trade name of Fiberfrax ® by Sohio Carborundum, Inc. of Niagara Falls, N.Y., a division of Standard Oil Corp. Also contained within container 50 is pre-filter 60, comprised of a series of fine-meshed metal screens to trap particulate material within the gas flow created by the combustion of propellant charge 54.

Upon ignition of the mixture 46 a, b within enhancer packet 44 by, for example, ignition squib 40, the hot gases thus produced pass through gas ports 62 located between the ignition chamber and the combustion chamber (as defined by combuster cup 48) and impinge against the inner annular portion of container 50, thus rapidly heating container 50 and the propellant charge within.

Upon reaching the required ignition temperature for propellant 54, which may vary depending upon the propellant chosen, the walls of container 50 burst at a number of locations which abut gas ports 64 (preferably thirteen in number, although the amount may be varied), thus permitting the gas produced as a product of the combustion of propellant 54 to pass through prefiltering zone 60 and subsequently out of container 40 through gas ports 64.

Once the gas exits through ports 64, it enters slag filter 66 until this filter is completely pressurized. Filter 66 is comprised of a twisted layer of a coarse steel wool material, capable of removing most of the remaining particulate material from the gas flow while also reducing the temperature of the flow. As the combustion of propellant 54 continues, forming additional gaseous products which exit through port 64 and enter filter 66, the gas bypasses filter 66 and flows directly into filter 68, although the heavier particulates deviate from this path to fly directly into filter 66 where they are subsequently trapped. Filter 68 comprises several layers of mesh screen 68 a, b having a steadily decreasing mesh size from the inside out, which are separated by a spacer pad 68c of the type previously described. The cooled, filtered gas then escapes from the generator through a plurality of diffuser ports 34 located around a peripheral portion of diffuser plate 28.

As mentioned above, however, the combustion reaction of the solid gas generating material produces a gaseous product at an elevated temperature. This gaseous product often contains particulate materials which can damage or destroy the integrity of the air bag by impinging directly against its inner surface. Applicants have now devised a deflector ring having a "J"-shaped cross-sectional configuration which may be stamped from a relatively light weight material such as low carbon steel which weighs less than the previously utilized steel parts which required detailed machining by highly trained laborers. A number of alternate light weight metals, such as titanium, aluminum and stainless steel, may be utilized as replacements for the low carbon steel currently in use. Applicants' ring costs a great deal less to produce since it may be stamped rather than machined. In addition, the stamping technique utilized by the applicants introduces a great deal less variability into the dimensions of ring 72, i.e., with regard to the placement and alignment of the mounting holes, etc. Applicants' ring member 72 does, however, retain enough strength to secure bag 24 to generator 22 despite its lightweight construction.

In addition, the stamping method now adopted for producing applicants' ring 70 facilitates the fabrication of a ring member which extends further into the mouth of bag 24 than the previously produced machined rings and which therefore provides a greater degree of protection against impingement by hot gases and high speed particulates. Applicants' novel deflector ring arrangement thus diminishes or even removes the need (demonstrated by the techniques adopted in the prior art) to provide air bag 24 with a sacrificial layer of fabric, which adds additional labor and therefore additional expense to the manufacturing of an air bag system.

In the embodiment described herein, the gas may be utilized to inflate bag 24 which is attached to mounting plate 36 by deflector ring 70. Mounting plate 36 is preferably a flat metal sheet defining a central aperture which is configured and adapted for the insertion therethrough of at least the diffuser plate portion of generator 22. Evenly disposed around the periphery of this central aperture are a plurality of mounting holes, preferably twelve in number, configured for the passage of mounting means such as screws, bolts, rivets, etc.

Figure 4:
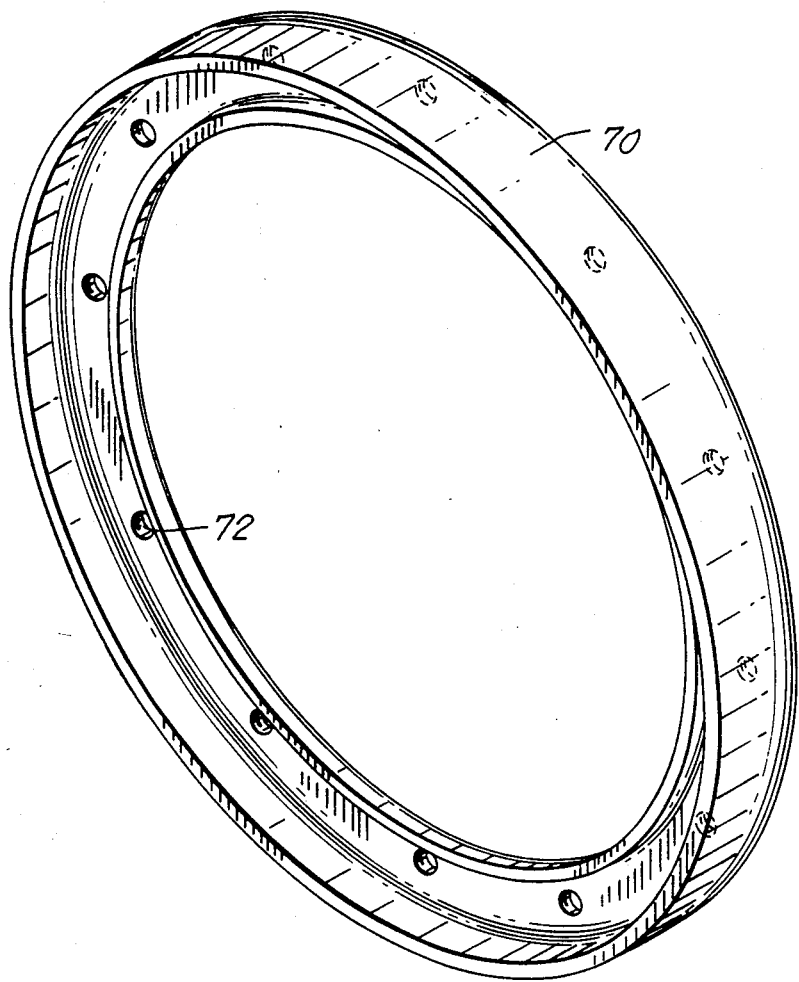
FIG. 4 is a perspective view of a deflector ring member for use with applicants' passive restraint system, constructed according to the invention.

In one embodiment of the present invention, a mouth portion of air bag 24 is folded over deflector ring 70 of the type illustrated in FIG. 4. The folded portion of air bag 24 is provided with a matching number of mounting holes (not shown) sewn into the fabric of the bag and spaced so as to permit their alignment with holes 72 in ring 70. Once the mouth of bag 24 is thus aligned, ring 70, together with bag 24 is fastened to a first face of mounting plate 36 with fastener means inserted through the mounting holes from the second (opposite) face of the plate.

In the preferred embodiment of the invention, eight such fasteners are utilized, i.e., two in each quadrant, passing initially through plate 36, then through air bag 24 and finally through deflector ring 70, as shown in FIG. 3. Four unencumbered mounting holes thus remain in both plate 36 and deflector ring 70, one of which is preferably located in each quadrant of plate 36 in a square configuration. The diffuser portion of generator 22 is subsequently positioned within the mouth of bag 22 by inserting diffuser plate 28 through the central aperture in mounting plate 36, thus permitting apertures 35 defined by flanges 30, 32 of generator 22 to align with the four remaining mounting holes in plate 36, as well as with the corresponding holes 72 in ring member 70.

Fastener means are then inserted through the aperture in flanges 30, 32, passing through plate 36, then air bag 24 and finally through holes 72 in ring 70. This arrangement firmly mounts generator 22 upon plate 36 in a manner such that the diffusion ports 34 of generator 22 are located within the mouth of bag 24. Ring 70 thus provides a barrier between diffusion ports 34 of generator 22 and the inner surface of bag 24 to deflect the hot gasses and particulate materials away from direct contact with the inner surface of the bag and into the central portion thereof.

While it is apparent that the invention herein disclosed is well calculated to fulfill the objectives stated above, it will be appreciated that numerous modifications and embodiments may be devised by those skilled in the art, and it is intended that the appended claims cover all such modifications and embodiments as fall within the true spirit and scope of the present invention.

We claim:

1. A vehicle passive restraint device comprising:
   (a) air bag means positioned between an occupant of said vehicle and an interior portion thereof for protecting said occupant from an impact with said interior portion in the event of a collision involving said vehicle;
   (b) generator means for producing a sufficient quantity of a gaseous combustion product to inflate said air bag means in an interval occurring between said collision and said impact in order to prevent said impact; and
   (c) deflector ring means positioned between said air bag means and said generator means for attaching said bag to said generator and extending a sufficient distance into an interior portion of said bag for preventing hot combustion gases and particulates produced within said generator means from impinging directly against an inner surface of said bag means, wherein said deflector ring is mounted such that a shorter leg portion of said ring is positioned adjacent said generator means where-upon the remaining longer leg portion is positioned at a location relatively removed from said generator means; and wherein said deflector ring means is stamped from a relatively light weight material utilizing conventional stamping equipment without the necessity of subjecting said ring means to any machining treatment and wherein said ring means possesses sufficient structural strength to position and maintain said air bag means in relation to said generator means when said generator means is actuated in order to inflate said air bag means.

2. The passive restraint device of claim 1 wherein said relatively light weight material is selected from the group consisting of low carbon steel, titanium, stainless steel and aluminum.

3. The passive restraint device of claim 1 wherein said deflector ring means is a circular member having a J-shaped cross-sectional configuration.

4. The passive restraint device of claim 3 wherein said deflector ring further comprises a plurality of mounting holes defined by a base portion thereof, said holes being evenly spaced along the circumference of said ring.

5. The passive restraint device of claim 4 wherein said deflector ring is mounted upon mounting plate means by fastening means inserted through apertures defined by said plate means and thereafter through said mounting holes in said deflector ring.

6. The passive restraint device of claim 5 wherein said fastening means are screws, bolts, or rivets.

7. A vehicle passive restraint device comprising:
   (a) air bag means positioned between an occupant of said vehicle and an interior portion thereof for protecting said occupant from an impact with said interior portion in the event of a collision involving said vehicle;
   (b) generator means for producing a sufficient quantity of a gaseous combustion product to inflate said air bag means in an interval occurring between said collision and said impact in order to prevent said impact; and
   (c) deflector ring means positioned between said air bag means and said generator means for attaching said bag to said generator and extending a sufficient distance into an interior portion of said bag for preventing hot combustion gases and particulates produced within said generator means from impinging directly against an inner surface of said bag means, wherein said deflector ring is mounted such that a shorter leg portion of said ring is positioned adjacent said generator means whereupon the remaining longer leg portion is positioned at a location relatively removed from said generator means; and wherein said deflector ring means is stamped from a relatively light weight material utilizing conventional stamping equipment without the necessity of subjecting said ring means to any machining treatment and wherein said ring means possesses sufficient structural strength to position and maintain said air bag means in relation to said generator means when said generator means is actuated in order to inflate said air bag means;

and wherein said generator means comprises:
   (a) base plate means;
   (b) diffuser plate means having a peripheral portion thereof sealingly connected to a corresponding portion of said base plate means so as to form a portion of a housing for the generator, and
   (c) means for engaging said base plate means with said diffuser plate means, said engaging means passing perpendicularly through both said diffuser and said base plate means and capable of permitting a minimal separation between both said diffuser and said base plate means in the event of an overpressurization of said generator to safely direct gas away from said housing,
   wherein said generator means comprises at least three concentrically aligned toroidal zones, whereby a first zone contains means for igniting a gas generating composition; a second zone contains a solid gas generating composition operable upon ignition to produce gas and particulate reaction products; and a third zone contains filtration means to cool said gas and to trap said particulate products, said third zone being further provided with orifice means for discharging gas from said housing.

8. The passive restraint device of claim 7 wherein said relatively light weight material is selected from the group consisting of a low carbon steel, titanium, stainless steel and aluminum.

9. The passive restraint device of claim 8 wherein said deflector ring means is a circular member having a J-shaped cross-sectional configuration.

10. The passive restraint device of claim 9 wherein said deflector ring further comprises a plurality of mounting holes defined by a base portion thereof, said holes being evenly spaced along the circumferences of said ring.

11. The passive restraint device of claim 10 wherein said deflector ring is mounted upon mounting plate means by fastening means inserted through apertures defined by said plate means and thereafter through said mounting holes in said deflector ring.

12. The passive restraint device of claim 11 wherein said fastening means are screws, bolts, or rivets.

13. The vehicle passive restraint device of claim 7 wherein said means for engaging said base plate means with said diffuser plate means of said generator means is a plurality of rivet members arranged around said outer peripheral portion of said generator housing.

14. The vehicle restraint device of claim 7 wherein said of said base plate means and said diffuser plate means further comprises corresponding flange means located along said outer peripheral portion, each said flange means defining at least one aperture therethrough for attaching said generator to a mounting plate and to said deflector ring.

15. The vehicle restraint device of claim 14 wherein said diffuser plate and said base plate are at least partially connected along their periphery by a weld.

16. The vehicle restraint device of claim 7 wherein said the first zone of said generator contains enhancer packet means comprising a homogeneous mixture of an ignition enhancing material and an auto ignition composition.

17. The vehicle restraint device of claim 7 wherein said second zone of said generator further comprises prefiltering means located along an outer peripheral portion of said second zone, wherein said prefiltering means comprises at least one layer of screening means positioned so as to remove a portion of said particulate products from said gas.

18. The vehicle restraint device of claim 7 wherein said third zone includes a first portion containing first filtering means for removal of a major portion of said particulate reaction products from said gas whereby said gas passes through said second filtering means and subsequently through said third filtering means.

19. A vehicle restraint device of claim 18 wherein said first filtering means comprises chamber means substantially filled with a plurality of unaligned metal fiber means.

20. The vehicle restraint device of claim 18 wherein said second filtering means comprises screening means having a predetermined mesh size, said mesh size being sufficient to prevent the passage therethrough of substantially all of said particulate reaction products remaining in said gas.

21. The vehicle restraint device of claim 20 wherein said third filtering means comprises screening means having a mesh size relatively narrower than that utilized with said second filtering means.

22. The vehicle restraint device of claim 21 wherein said gas discharge orifice means comprises a plurality of diffusion ports located along side peripheral portion of said diffuser plate, adjacent and exterior to said third filtering means.

23. A vehicle passive restraint device comprising:
(a) air bag means positioned between an occupant of said vehicle and an interior portion thereof for protecting said occupant from an impact with said interior portion in the event of a collision involving said vehicle;
(b) generator means for producing a sufficient quantity of a gaseous combustion product to inflate said air bag means in an interval occurring between said collision and said impact in order to prevent said impact; and
(c) deflector ring means positioned between said air bag means and said generator means for attaching said bag to said generator and extending a sufficient distance into an interior portion of said bag for preventing hot combustion gases and particulates produced within said generator means from impinging directly against an inner surface of said bag means, wherein said deflector ring is mounted such that a shorter leg portion of said ring is positioned adjacent said generator means whereupon the remaining longer leg portion is positioned at a location relatively removed from said generator means;
and wherein said deflector ring means is stamped from a relatively light weight material utilizing conventional stamping equipment without the necessity of subjecting said ring means to any machining treatment and wherein said ring means possesses sufficient structural strength to position and maintain said air bag means in relation to said generator means when said generator means is actuated in order to inflate said air bag means;
wherein said generator means comprises
(a) a housing constructed of a relatively light weight, corrosion resistant, high tensile strength material, defining at least three concentric toroidal zones, whereby a first zone contains means for igniting a gas generating composition; a second zone contains a solid gas generating composition operable upon ignition to produce gas and particulate reaction products; and a third zone contains filtration means to cool said gas and to trap said reaction products, said third zone being further provided with gas discharge orifice means;
(b) base plate means;
(c) diffuser plate means having a peripheral portion thereof sealingly connected to a corresponding portion of said base plate means so as to form a portion of a housing for the generator,
(d) means for engaging said base plate means with said diffuser plate means, said engaging means passing perpendicularly through both said diffuser plate means and said base plate means capable of permitting a minimal separation between both said plate means in the event of an overpressurization of said generator to safely direct gas away from said housing,
(e) means for igniting said solid gas-generating composition, said ignition means located in an aperture in a central portion of said base plate means;
(f) an enhancer packet comprising a homogeneous mixture of an ignition enhancing material and an autoignition composition located in said first zone of said housing means;
(g) spacer means between said solid gas-generating composition and said housing to prevent abrasion of said composition due to contact with an inner surface of the housing;
(h) prefiltering means located along a peripheral portion of said first zone between said solid gas generating composition and said third zone;
(i) filtering means located in said third zone and comprising a first portion for removal of a major portion of said particulate reaction products from said gas, and a second portion for removing substantially all of any remaining particulate reaction products from said gas, whereby said gas passes through said first portion of said filtering means prior to passing through said second portion; and (j) gas discharge orifice means comprising a plurality of diffusion ports located along said peripheral portion of said diffuser plate means;

wherein said solid gas generating composition is in the form of a plurality of pressed toroidal discs in stacked relation, each disc having means to permit air to circulate around at least a portion of one of its surfaces and whereby the gas produced by the combustion of said toroidal discs is cooled and cleaned by passing through said prefiltering means and thereafter through said filtering means.

* * * * *